US008593393B2

(12) United States Patent
Jung et al.

(10) Patent No.: US 8,593,393 B2
(45) Date of Patent: Nov. 26, 2013

(54) BACKLIGHT UNIT AND DISPLAY APPARATUS HAVING THE SAME

(75) Inventors: Il-yong Jung, Yongin-si (KR); Jun-mo Yoo, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 346 days.

(21) Appl. No.: 12/847,323

(22) Filed: Jul. 30, 2010

(65) Prior Publication Data

US 2011/0141005 A1 Jun. 16, 2011

(30) Foreign Application Priority Data

Dec. 16, 2009 (KR) .......................... 10-2009-0125309

(51) Int. Cl.
G09G 3/36 (2006.01)

(52) U.S. Cl.
USPC .................. 345/102; 345/89; 349/61; 349/62

(58) Field of Classification Search
USPC .................. 345/102, 89–92, 690; 349/61–71; 362/97.1–97.3, 555, 561, 600–634
See application file for complete search history.

(56) References Cited

U.S. PATENT DOCUMENTS

| 5,833,517 | A | 11/1998 | Konda et al. | |
|---|---|---|---|---|
| 6,927,812 | B2* | 8/2005 | Cho | 349/65 |
| 7,253,799 | B2* | 8/2007 | Lee et al. | 345/102 |
| 7,505,024 | B2* | 3/2009 | Yoo et al. | 345/102 |
| 2006/0002146 | A1 | 1/2006 | Baba | |
| 2007/0052662 | A1* | 3/2007 | Kim et al. | 345/102 |
| 2008/0025686 | A1 | 1/2008 | Lee et al. | |
| 2008/0055931 | A1* | 3/2008 | Verstraete et al. | 362/612 |
| 2008/0231590 | A1* | 9/2008 | Choi et al. | 345/102 |
| 2010/0045898 | A1* | 2/2010 | Lee et al. | 349/65 |
| 2010/0188601 | A1* | 7/2010 | Onishi | 349/61 |

FOREIGN PATENT DOCUMENTS

| DE | 10 2004 046 256 A1 | 4/2006 |
|---|---|---|
| EP | 1640756 A1 | 3/2006 |
| EP | 1959277 A1 | 8/2008 |
| JP | 2005-005067 A | 1/2005 |
| KR | 10-2003-0060023 A | 12/2003 |
| KR | 10-0793536 A | 1/2008 |
| WO | 01/84046 A1 | 11/2001 |
| WO | 2009/084894 A1 | 7/2009 |

OTHER PUBLICATIONS

Communication dated May 10, 2011, issued by the European Patent Office in counterpart European application No. 10174420.9.
Communication dated Oct. 10, 2012 issued by the European Patent Office in counterpart European Application No. 10174420.9.
Communication, dated Jul. 9, 2013, issued by the European Patent Office, in counterpart Application No. 10174420.9.

* cited by examiner

*Primary Examiner* — Koosha Sharifi-Tafreshi
(74) *Attorney, Agent, or Firm* — Sughrue Mion, PLLC

(57) ABSTRACT

A display apparatus includes a display panel which is divided into a plurality of display areas; a plurality of light guide plates which transmit light to the display areas of the display panel; a plurality of light source modules alternately arranged with and interposed between the light guide plates, each light source module being disposed along a lateral side of an adjacent light guide plate and including a plurality of light sources for emitting light to the lateral side of the adjacent light guide plate, and a module substrate on which the light sources are mounted; and a plurality of reflective plates which reflect the light emitted by the light sources and transmitted by the light guide plates, wherein each of the reflective plates is interposed between a rear surface of a corresponding light guide plate and at least one module substrate.

17 Claims, 6 Drawing Sheets

BACKLIGHT UNIT AND DISPLAY APPARATUS HAVING THE SAME

CROSS-REFERENCE TO RELATED APPLICATION

This application claims priority from Korean Patent Application No. 10-2009-0125309, filed on Dec. 16, 2009 in the Korean Intellectual Property Office, the disclosure of which is incorporated herein by reference.

BACKGROUND

1. Field

Apparatuses and methods consistent with exemplary embodiments relate to a backlight unit that uses a light source to emit light and a light guide plate to transmit the light for displaying an image, and a display apparatus having the same, and more particularly, to a backlight unit including a plurality of light guide plates corresponding to a plurality of divided display areas, respectively, and a display apparatus having the same.

2. Description of the Related Art

A display apparatus includes a display panel where an image is displayed, and is capable of processing a broadcasting signal or video data of various formats, e.g., to be displayed, which can be achieved by a television (TV), a monitor, etc. Types of display panels include a liquid crystal display panel, a plasma display panel or the like. If the display panel cannot generate light by itself, the display apparatus includes a backlight unit that generates and emits light to the display panel.

The backlight unit of the display apparatus may include light emitting diodes (LEDs) as a light source for generating light since LEDs are excellent in environmental protection, response time, etc. as compared with a cold cathode fluorescent lamp. The backlight unit is classified into a direct type and an edge type according to relative positions of a light source to a light guide plate.

In the case of the direct-type backlight unit, a light source is arranged in parallel to and along a rear surface of the light guide plate, so that the light source can directly emit light to the display panel placed in front thereof. On the other hand, in the case of the edge-type backlight unit, a light source is arranged in the form of a bar along the edges of the light guide plate, so that light from the light source can enter the edge of the light guide plate and be projected to the display panel. Since the light source of the edge-type backlight unit is arranged at the edge of the light guide plate, the edge-type backlight unit is advantageously slimmer than the direct-type backlight unit and thus widely used in display apparatuses.

SUMMARY

According to an aspect of an exemplary embodiment, there is provided a display apparatus including: a display panel which is divided into a plurality of display areas; a plurality of light guide plates which transmit light to the plurality of display areas of the display panel; a plurality of light source modules alternately arranged with and interposed between the plurality of light guide plates, each light source module being disposed along a lateral side of an adjacent light guide plate of the plurality of light guide plates and including a plurality of light sources for emitting light to the lateral side of the adjacent light guide plate, and a module substrate on which the plurality of light sources are mounted and which is disposed at a rear side of the adjacent light guide plate; and a plurality of reflective plates which are respectively disposed on rear surfaces of the plurality of the light guide plates, and reflect the light emitted by the plurality of light sources and transmitted by the plurality of light guide plates toward the plurality of display areas, wherein each of the plurality of reflective plates is interposed between a rear surface of a corresponding light guide plate of the plurality of light guide plates and at least one module substrate of the plurality of module substrates The display apparatus may further include a diffusion plate which is interposed between the display panel and the plurality of light guide plates and diffuses light transmitted from the light guide plate.

The display apparatus may further include a cover unit which forms an outer frame of the display apparatus; and transparent screws which fasten the light guide plates and the reflective plates to the cover unit, and each transparent screw including a screw head which supports the diffusion plate to maintain a gap between the diffusion plate and the light guide plate.

At least one of the plurality of light guide plates may include a first region disposed inside a light emission range of the plurality of light sources of a corresponding light source module of the plurality of light source modules, and a second region disposed outside the light emission range of the plurality of light sources of the corresponding light source module, and the first region has a first light guiding pattern formed thereon and the second region has a second light guiding pattern formed thereon which is different from the first light guiding pattern.

A density of the second light guiding pattern formed in the second region may be greater than a density of the first light guiding pattern formed in the first region.

The second pattern may be formed in a third region of the at least one of the plurality of light guide plates, and the third region includes the second region and has one of a triangular shape and a pentagonal shape.

At least one light guide plate of the plurality light guide plates may include a first region in which an amount of incident light from the plurality of light sources of a corresponding light source module of the plurality of light source modules is larger than a preset value, and a second region in which an amount of incident light from the plurality of light sources of the corresponding light source module is smaller than the preset value, and the first region has a first light guiding pattern formed thereon and the second region has a second light guiding pattern formed thereon which is different from the first light guiding pattern.

A density of the second light guiding pattern formed in the second region may be greater than a density of the first light guiding pattern formed in the first region.

The second region may be located between two adjacent light sources of the plurality of light sources of the corresponding light source module.

At least one light guide plate of the plurality of light guide plates comprises a plurality of pattern regions having a preset shape, the pattern regions being formed on a front or rear side of the at least one light guide plate at locations between adjacent light sources of the plurality of light sources of a corresponding light source module.

The plurality of light sources of a first light source module of the plurality of light source modules and the plurality of light sources of a second light source module of the plurality of light source modules adjacent to the first light source module are arranged alternately in a longitudinal direction of the first and second light source modules.

According to an aspect of another exemplary embodiment, there is provided a backlight unit for irradiating a display panel, the backlight unit including a plurality of light guide plates a plurality of light source modules alternately arranged with the plurality of light guide plates, each light source module being disposed along a lateral side of an adjacent light guide plate of the plurality of light guide plates and including a plurality of light sources for emitting light to the lateral side of the adjacent light guide plate, and a module substrate on which the plurality of light sources are mounted and which is disposed at a rear side of the adjacent light guide plate; and a plurality of reflective plates which are respectively disposed on rear surfaces of the plurality of the light guide plates, and reflect the light emitted by the plurality of light sources and transmitted by the plurality of light guide plates, wherein each of the plurality of reflective plates is interposed between a rear surface of a corresponding light guide plate of the plurality of light guide plates and at least one module substrate of the plurality of module substrates.

The backlight unit may further include a diffusion plate which is disposed on the light guide plates and diffuses light transmitted from the light guide plates.

The backlight unit may further include transparent screw which fasten the light guide plate and the reflective plate, the transparent screw including a screw head which supports the diffusion plate on the light guide plates to maintain a gap between the diffusion plate and the light guide plates.

At least one of the plurality of light guide plates may include a first region disposed inside a light emission range of the plurality of light sources of a corresponding light source module of the plurality of light source modules, and a second region disposed outside the light emission range of the plurality of light sources of the corresponding light source module, and the first region has a first light guiding pattern formed thereon and the second region has a second light guiding pattern formed thereon which is different from the first light guiding pattern.

A density of the second light guiding pattern formed in the second region may be greater than a density of the first light guiding pattern formed in the first region.

The second pattern may be formed in a third region of the at least one of the plurality of light guide plates, and the third region comprises the second region and has one of a triangular shape and a pentagonal shape.

At least one light guide plate of the plurality light guide plates may include a first region in which an amount of incident light from the plurality of light sources of a corresponding light source module of the plurality of light source modules is larger than a preset value, and a second region in which an amount of incident light from the plurality of light sources of the corresponding light source module is smaller than the preset value, and the first region has a first light guiding pattern formed thereon and the second region has a second light guiding pattern formed thereon which is different from the first light guiding pattern.

A density of the second light guiding pattern formed in the second region may be greater than a density of the first light guiding pattern formed in the first region.

The second region may be located between two adjacent light sources of the plurality of light sources of the corresponding light source module.

The plurality of light sources of a first light source module of the plurality of light source modules and the plurality of light sources of a second light source module of the plurality of light source modules adjacent to the first light source module are arranged alternately in a longitudinal direction of the first and second light source modules.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. In the following description, only elements directly related to the spirit of the inventive concept will be described, but descriptions about the other elements are omitted. However, it does not mean that the omitted elements are not necessary for embodying the display apparatus to which the spirit of the inventive concept is applied.

Figure 1:
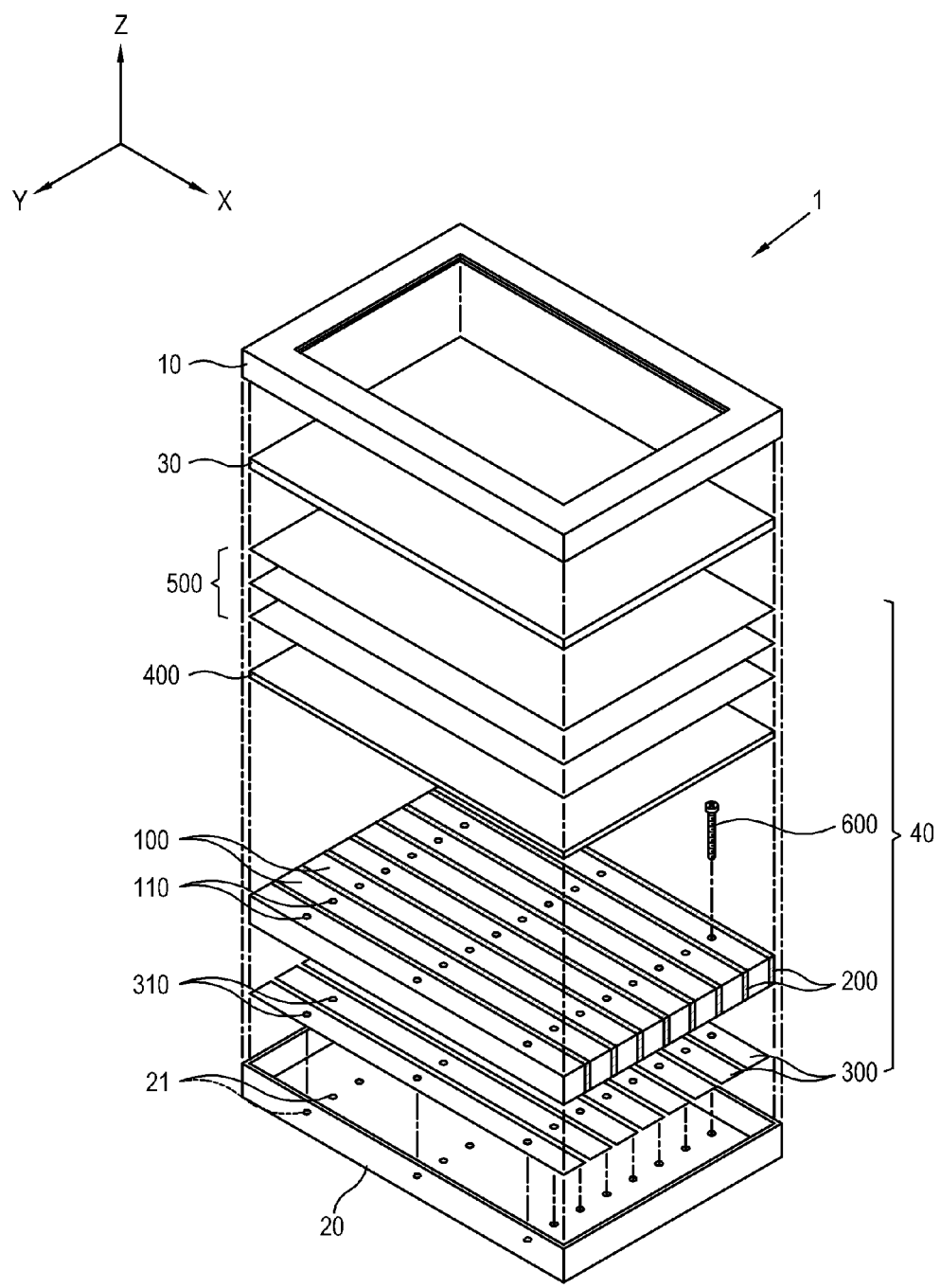
FIG. 1 is an exploded perspective view of a display apparatus according to an exemplary embodiment.

FIG. 1 is an exploded perspective view schematically showing a display apparatus according to an exemplary embodiment.

As shown in FIG. 1, a display apparatus 1 according to this embodiment includes a cover unit 10, 20 forming an accommodating space, a display panel 30 accommodated in the accommodating space of the cover unit 10, 20 and displaying an image, and a backlight unit 40 accommodated in the accommodating space and emitting light to the display panel 30 so that an image can be shown on the display panel 30.

In the drawings and this description, X, Y and Z directions refer to length, breadth and height directions, respectively. The display panel 30 is located on an X-Y plane, and the backlight unit 40 and the display panel 30 are arranged as stacked along the Z direction. Here, opposed directions of the X, Y and Z directions are represented as −X, −Y and −Z directions, and the X-Y plane is a plane formed by the X and Y directions.

The cover unit 10, 20 forms an outer frame of the display apparatus 1, and accommodates the display panel 30 and the backlight unit 40 therein. The cover unit 10, 20 includes an upper cover 10 and a lower cover 20 to cover the front of the display panel 30 and the rear of the backlight unit 40, respectively.

The upper cover 10 and the lower cover 20 form the accommodating space in which the display panel 30 and the backlight unit 40 are accommodated. The upper cover 10 has a surface parallel with the X-Y plane and formed with an opening through which a display area of the display panel 30 is exposed.

The lower cover 20 accommodates the backlight unit 40 and is formed with a plurality of lower-cover fastening holes 21, in which a plurality of transparent screws 600 to are inserted, on an inner surface thereof parallel to the X-Y plane.

The display panel 30 may be a liquid crystal display (LCD) panel in this exemplary embodiment. The display panel 30 includes two substrates (not shown) and a liquid crystal layer (not shown) interposed between the two substrates, and displays an image as the molecular arrangement of the liquid crystal layer is varied in response to a driving signal. The display panel 30 cannot emit light by itself, but instead receives light from the backlight unit 40 in order to show an image on the display area. Here, the display area is an area disposed in parallel to the X-Y plane and displaying an image thereon.

The display panel 30 includes a driving circuit board (not shown), so that the molecular arrangement of the liquid crystal layer can be rotated at a predetermined angle when receiving the driving signal from the driving circuit board. Thus, optical transmissivity of cells (not shown) constituting the display area of the display panel 30 is varied with regard to each cell, thereby displaying an image on the display area.

The backlight unit 40 is disposed at the rear of the display panel 30 so as to emit light to the display panel 30. The backlight unit 40 includes a plurality of light guide plates 100 through which light is transmitted toward the display area of the display panel 30, a plurality of light source modules 200 which emit light to the plurality of light guide plates 100, a plurality of reflective plates 300 which are disposed at positions corresponding to respective light guide plates 100 and reflect the light toward the display panel 30, a diffusion plate 400 which diffuses the light transmitted from the light guide plate 100, and an optical sheet 500 which adjusts characteristics of the light diffused by the diffusion plate 400.

The light guide plates 100 may be formed by an acrylic molding or the like, and uniformly transmit incident light from the light source modules 200 to the whole display area of the display panel 30. In this exemplary embodiment, each light guide plate 100 has a rectangular shape extending in the X direction. Eight light guide plates 100 are arrayed in the Y direction. However, the number, the shape, the extension direction, the arrayed relationship, etc. of the light guide plates 100 are not limited to this configuration.

Each light guide plate 100 includes at least one light-guide-plate fastening hole 110 formed therein. Each light-guide-plate fastening hole 110 and a corresponding lower-cover fastening hole 21 are coupled to each other by the transparent screws 600.

The light guide plates 100 are formed with a light guiding pattern or an optical pattern on a rear surface facing the reflective plates 300, thereby enhancing uniformity of light transmitted from the light guide plates 100 and adjusting the amount of transmitted light. That is, the brightness of the display area may be varied depending on the type of optical pattern formed on the rear surface of the light guide plates 100. For example, optical pattern may include a plurality of dots formed by a laser or printing method. The dots may be arranged to have a uniform distance between adjacent dots or arranged in parallel rows with a uniform distance between adjacent rows. A density of the optical pattern may be varied by changing a size of the dots, changing a distance between adjacent dots, or changing a distance between adjacent rows of dots.

The light source modules 200 generate light to irradiate the display panel 30, and are disposed at the lateral sides of the light guide plates 100 so that the generated light enters the light guide plates 100. That is, each light source module 200 extends in the same X direction as the light guide plates 100, and the light guide plates 100 and the light source modules 200 are alternately disposed side-by-side in the Y direction.

The light generated by the light source modules 200 is emitted to each light guide plate 100 in the Y direction, and then emerges from each light guide plate 100 in the Z direction, thereby entering the display panel 30. Thus, the display panel 30 can display an image on the display area parallel to the X-Y plane.

The reflective plates 300 are disposed on the rear or rear surface of the light guide plates 100, and reflect the light from the light guide plate 100 toward the display panel 30. Here, a plurality of reflective plates 300 are provided to correspond to the plurality of light guide plates 100, respectively, and each reflective plate 300 has a shape elongated in the X direction along the light guide plate 100. Also, the light guide plates 100 are arranged along the Y direction.

Each reflective plate 300 has at least one reflective-plate fastening hole 310 penetrating through the reflective plate 300. The reflective-plate fastening holes 310 are fastened together with the lower-cover fastening holes 21 and the light-guide-plate fastening holes 110 by the transparent screws 600.

The diffusion plate 400 diffuses the light transmitted from the light guide plates 100 and makes the brightness uniform throughout the display area.

The optical sheet 500 is disposed on the rear side of the display panel 30 is parallel to an X-Y plane of the display panel 30. The optical sheet 500 may include a plurality of sheets, i.e., a prism sheet, a diffusion sheet, a protection film, etc., and transmits light to the display panel 30 while adjusting characteristics of the light diffused by a diffusion plate 400.

With this configuration, the transparent screws 600 are utilized for fastening the light guide plates 100 and the reflective plates 300 to the lower cover 20. The transparent screws 600 are inserted through the light-guide-plate fastening holes 110, the reflective-plate fastening holes 310 and the lower-cover fastening holes 21, thereby achieving this fastening.

Below, an assembled configuration of the display apparatus 1 will be described by way of example with reference to FIG. 2 which illustrates a lateral cross-section view partially showing the assembled display apparatus of FIG. 1.

Figure 2:
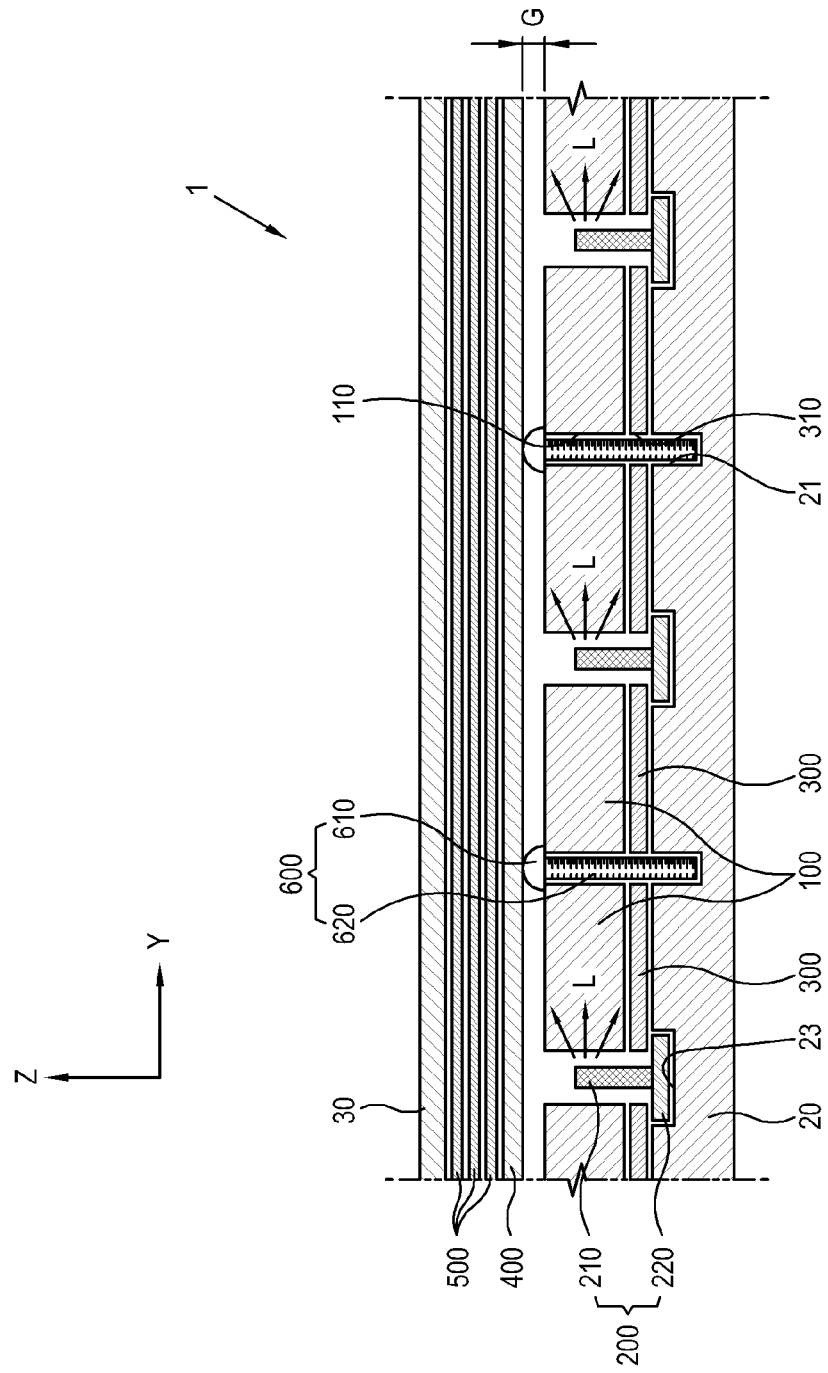
FIG. 2 is a lateral cross-section view partially showing the assembled display apparatus of FIG. 1.

As shown in FIG. 2, the back light unit 40 is disposed on a front surface of the lower cover 20. Here, a plurality of module-substrate accommodating parts 23 are formed on the front surface of the lower cover 20 to accommodate a module substrate 220 (to be described later) of each light source module 200.

The light source modules 200 are arranged in parallel to one another along the Y direction. Each light source module 200 includes a plurality of light sources 210 generating light L which is incident on the lateral side of the light guide plate 100, and the module substrate 220 on which the plurality of light sources 210 are mounted. Although not shown in FIG. 2, the light sources 210 included in each light source module 200 are sequentially arranged along the X direction.

The light sources 210 may be light emitting diodes (LEDs) erectly mounted on the module substrate 220. The light source 210 receives driving power and an on/off control signal from the module substrate 220. Here, each light source 210 included in the light source module 200 emits light in the same direction.

The light sources 210 mounted on each module substrate 220 may include a blue LED, a green LED and a red LED, and thus blue light, green light and red light emitted from the respective colorful LEDs are mixed to generate white light for good color reproduction. However, this is merely an example, and the light source 210 may include a white LED capable of directly generating white light.

Each module substrate 220 has a wiring configuration (not shown) for supplying power from system power for the display apparatus 1 to the mounted light source 210. The plurality of light sources 210 mounted on the module substrate 220 form a plurality of groups, and the foregoing wiring configuration supplies power to individual groups to thereby accomplish local dimming for selectively controlling the plurality of light sources 210 to be turned on/off.

Each module substrate 220 is accommodated in a correspond module-substrate accommodating part 23 and thus supported on the lower cover 20. A front surface of the module substrate 220 accommodated in the module-substrate accommodating part 23 is disposed at substantially the same height with the front surface of the lower cover 20. Accordingly, the reflective plates 300 can be stably positioned on the front surface of the module substrates 220 and the front surface of the lower cover 20.

The reflective plates 300 are interposed between the respective light sources 210 of two adjacent light source modules 200. The reflective plates 300 are provided corresponding to the light guide plates 100, respectively, and the light guide plates 100 are disposed on the reflective plate 300.

By way of comparison, a conventional configuration has the single reflective plate instead of the plurality of reflective plates of the present exemplary embodiment. In the conventional configuration, there is an area where the light from the light source is emitted to the module substrate instead of the reflective plate since the reflective plate is placed beneath the module substrate.

To prevent such an area from occurring, the present exemplary embodiment provides the plurality of reflective plates 300 interposed between the rear of the light guide plate 100 and the module substrate 220. Thus, the present exemplary embodiment prevents emission of some of the light L to the module substrate 220 unlike the conventional configuration, and it is possible to normally reflect the light L on the reflective plates 300.

Each transparent screw 600 is inserted through the light-guide-plate fastening hole 110, the reflective plate fastening hole 310 and the lower-cover fastening hole 21, so that the light guide plate 100 and the reflective plate 300 can be fastened to the lower cover 20. The transparent screws 600 are made of a transparent material capable of transmitting the light L so that there is no interference with the light L passing through the light guide plates 100.

Each transparent screw 600 includes a screw head 610, and a threaded screw body 620 extending from the screw head 610. When the transparent screw 600 is completely inserted, the screw body 620 penetrates the light-guide-plate fastening hole 110, the reflective-plate fastening hole 310 and the lower-cover fastening hole 21, and the screw head 610 is disposed on a front surface of the light guide plate 110 from which the light L is emerged. The diffusion plate 400 is disposed on the screw head 610, so that the screw head 610 supports the diffusion plate 400 against the light guide plate 100. Since the screw head 610 has a predetermined thickness, the diffusion plate 400 is prevented from bending in the—Z direction by its own weight, and a gap G is maintained between the diffusion plate 400 and the light guide plate 100.

Below, the light guiding pattern formed on the light guide plates 100 will be described with reference to FIG. 3 which is a partial plan view of one light guide plate 100 and the light source module 200 corresponding thereto in the display apparatus.

Figure 3:
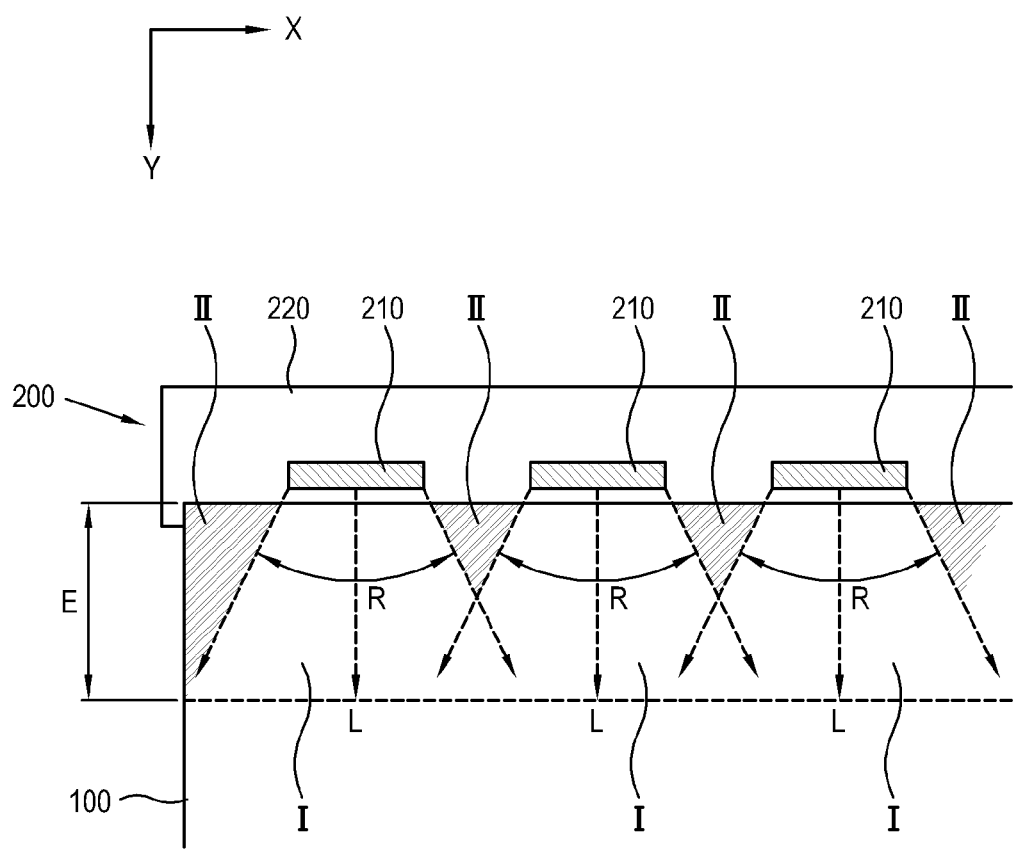
FIG. 3 is a partial plan view of one light guide plate and a light source module corresponding thereto in the display apparatus of FIG. 2.

As shown in FIG. 3, the light guide plate 100 is extended in the X-direction, and the plurality of light sources 210 are sequentially arranged along the X direction as being adjacent to one lateral side of the light guide plate 100.

The light guide plate 100 is formed with the optical pattern on the surface thereof parallel to the X-Y plane, thereby scattering the light. If the optical pattern is varied in density within one area, brightness becomes higher as the density of the optical pattern increases because more light is scattered. Accordingly, the shorter distance from the light source 210, the higher the density of the optical pattern of the light guide plate 100, and the longer distance from the light source 210, the lower the density of the optical pattern of the light guide plate 100.

The light guide plate 100 has a region within a predetermined distance from a side, at which the light source 210 is located, in a direction of emitting the light L, thereby forming a light incident portion E. The light incident portion E is a predetermined region adjacent to the light source 210 in the light guide plate 100, which has a uniform width in the Y direction and extends in the X direction. The width of the light incident portion E in the Y direction is not limited, and the light incident portion E may be a region where loss of the light L emitted from the light source 210 is less than a preset value.

The respective light sources 210 are arranged at predetermined intervals from the adjacent light source 210, and emit the light L to the light incident portion E. Since the light source 210 emits the light L within a range of a predetermined angle, a light emission range R of each light source 210 is defined.

However, there is a partial region of the light incident portion E, excluded from each light emission range R of two adjacent light sources 210, because the light sources 210 are spaced apart from each other. Hereinafter, a region of the light incident portion E, included in the light emission range R of the light source 210, will be referred to as a first region I, and a region of the light incident portion E, excluded from the light emission region R of the light source 210, will be referred to as a second region II.

The second region II is located between two adjacent light sources 210 and placed outside the light emission range R of the light source 210, so that the amount of incident light thereof is smaller than that of the first region I. Accordingly, if the optical patterns of the first and second regions I and II have the same density, the brightness of the display area corresponding to the second region II is relatively lower thereby forming a dark portion. Such a dark portion deteriorates the quality of an image displayed on the display area.

Therefore, according to an exemplary embodiment, the optical patterns of the first region I and the second region II have different densities. Specifically, the optical pattern formed in the second region II is denser than that in the first region I. To increase the density of the optical pattern, the size of the dots forming the optical pattern may be relatively increased.

As the optical pattern of the second region II becomes denser, light scattering in the second region II increases and thus the amount of emitted light in the second region II increases.

Accordingly, a difference in the brightness between the display areas respectively corresponding to the first region I and the second region II can be reduced in the light incident portion E, thereby improving the quality of an image.

Figure 4:
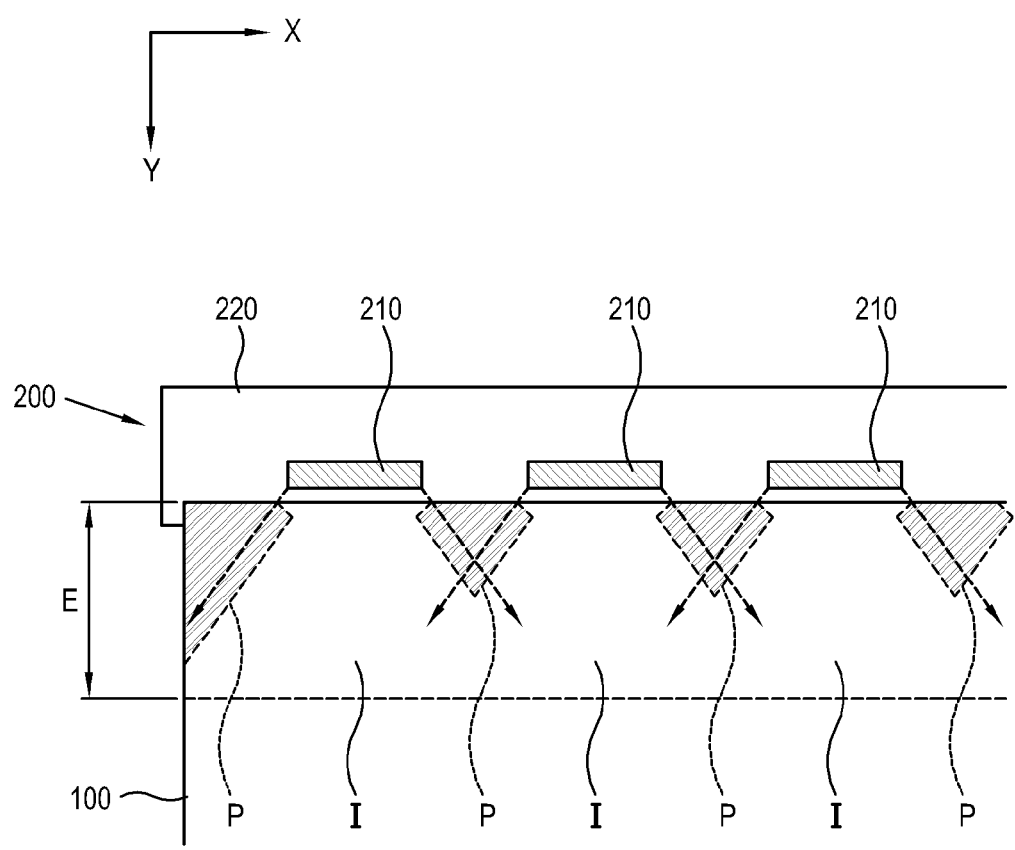
FIG. 4 is a partial plan view exemplarily showing a light guiding pattern formed in the light guide plate of FIG. 3.

In the light guide plate 100, a dense pattern region P including the second region II may have a triangular shape corresponding to the shape of the second region II, but is not limited to such a shape. Alternatively, the dense pattern region P including the second region II may have a pentagonal shape as shown in FIG. 4.

The dense pattern region P may be formed to correspond to the second region II or to include the second region II. Here, the optical pattern between the dense pattern region P and the first region I is gradually varied in density.

Figure 5:
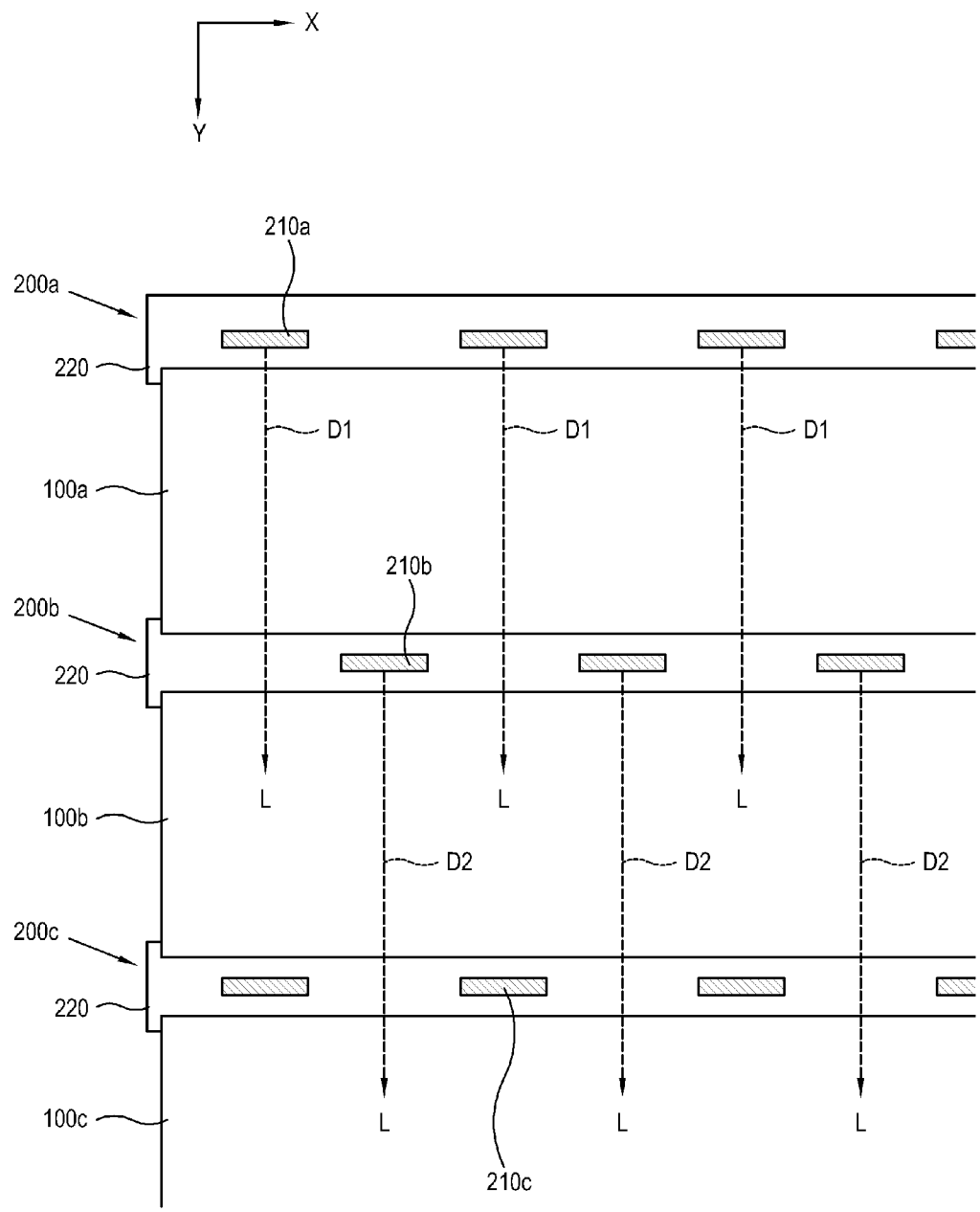
FIG. 5 is a partial plan view exemplarily showing light sources arranged with respect to the light guide plates in the display apparatus of FIG. 2.

Below, arrangement of each light source 210 of the light source modules 200a, 200b and 200c will be described with reference to FIG. 5. FIG. 5 is a partial plan view exemplarily showing the arrangement between the plurality of light sources 210 provided in the plurality of light guide plates 100a, 100b and 100c, respectively.

As shown in FIG. 5, the first light guide plate 100a, the second light guide plate 100b and the third light guide plate 100c are arranged in sequence along the Y direction, and the first light source module 200a, the second light source module 200b and the third light source module 200c emit light L corresponding to the light guide plate 100a, the light guide plate 100b and the light guide plate 100c, respectively. The first light guide plate 100a is adjacent to the second light guide plate 100b, and the second light guide plate 100b is adjacent to the third light guide plate 100c.

A light emitting direction of the light sources 210a included in the first light source module 200a corresponding to the first light guide plate 100a is parallel to the Y direction such that the light L from each light source 210a travels along a first axial line D1. On the other hand, a light emitting direction of the light sources 210b included in the second light source module 200b corresponding to the second light guide plate 100b is parallel to the Y direction such that the light L from each light source 210 travels along a second axial line D2.

Here, the plurality of light sources 210a provided in the first light source module 200a and the plurality of light sources 210b provided in the second light source module 200b are arranged alternately. That is, the first axial line D1 and the second axial line D2 are not aligned with each other.

If the plurality of light sources 210a provided in the first light source module 200a and the plurality of light sources 210b provided in the second light source module 200b are aligned on one line, the light L emitted from the light source 210a of the first light source module 200a interferes with the light emitted from the light source 210b of the second light source module 200b and thus has difficulty in entering the second light guide plate 100b.

According to this embodiment, the light sources 210b of the second light source module 200b are arranged not to be aligned with the first axial line D1 so that the light emitted from the light source 210a of the first light source module 200a can easily enter the second light guide plate 100b. Thus, it is possible to make the brightness more uniformly throughout the display area.

Similarly, the light sources 210c of the third light source module 200c corresponding to the third light guide plate 100c are arranged like those of the first light source module 200a. That is, the foregoing embodiment is also applied to the arrangement of the light sources 210b and 210c respectively corresponding to the second light guide plate 100b and the third light guide plate 100c, and thus repetitive descriptions thereof will be omitted.

Also, the foregoing exemplary embodiments may be applied to various types of the display apparatuses.

Figure 6:
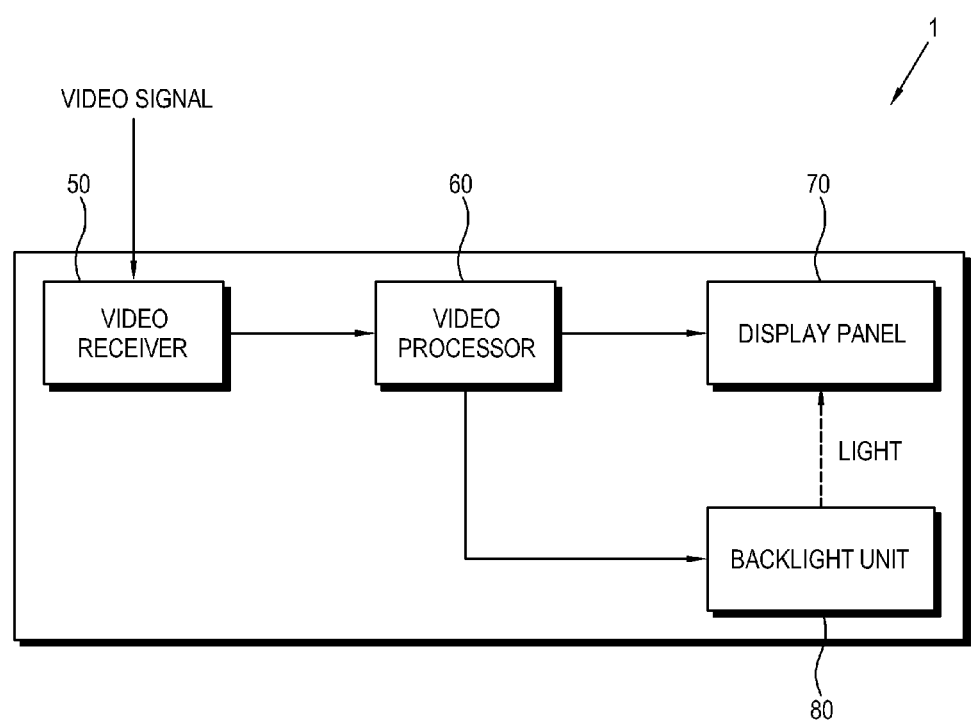
FIG. 6 is a control block diagram of the display apparatus of FIG. 1.

FIG. 6 is a control block diagram of the display apparatus 1 according to an exemplary embodiment. In FIG. 6, the solid lines indicate transmission of a video signal or a control signal, and the dotted lines indicate transmission of light.

As shown in FIG. 6, the display apparatus 1 according to this embodiment includes a video receiver 50 which receives a video signal, a video processor 60 which processes the video signal received in the video receiver 50, a display panel 70 which displays an image based on the video signal processed by the video processor 60, and a backlight unit 80 emits light so that an image displayed on the display panel 70 cab be shown.

The video receiver 50 may have various standards as follows. For example, if the display apparatus 1 is a television (TV), the video receiver 60 may wirelessly receive a radio frequency (RF) signal output from a broadcasting station (not shown), or may receive a video signal based on standards such as composite video, component video, super video, SCART, High definition multimedia interface (HDMI), etc. Besides, if the display apparatus 1 is a monitor for a computer system, the video receiver 50 may receive a video signal based on standards such as a D-SUB for transmitting an RGB signal according to VGA, digital video interactive (DVI), HDMI, etc.

The video processor 60 applies various preset video processes to the video signal transmitted from the video receiver 50. The types of video processes that can be performed in the video processor 60 are not limited. For example, the video processes may include decoding and encoding corresponding to various video formats, de-interlacing, frame refresh rate conversion, scaling, noise reduction, detail enhancement, etc.

The video processor 60 may be achieved by individual configurations capable of performing the foregoing respective processes, or may be achieved by an all-in-one configuration in which various functions are integrated.

The display panel 70 and the backlight unit 80 have the same configuration as described above, and thus repetitive descriptions thereof will be avoided.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
a video receiver which receives a video signal;
a video processor which processes the video signal received by the video receiver;
a display panel which is divided into a plurality of display areas;
a plurality of light guide plates which transmit light to the plurality of display areas of the display panel;
a plurality of light source modules alternately arranged with and interposed between the plurality of light guide plates, each light source module being disposed along a lateral side of an adjacent light guide plate of the plurality of light guide plates and comprising a plurality of light sources for emitting light to the lateral side of the adjacent light guide plate, and a module substrate on which the plurality of light sources are mounted and which is disposed at a rear side of the adjacent light guide plate, the rear side of the adjacent light guide plate being perpendicular to the lateral side of the adjacent light guide plate; and
a plurality of reflective plates which are respectively disposed on rear surfaces of the plurality of the light guide plates, and reflect the light emitted by the plurality of light sources and transmitted by the plurality of light guide plates toward the plurality of display areas, wherein each of the plurality of reflective plates is interposed between a rear surface of a corresponding light guide plate of the plurality of light guide plates and at least one module substrate of the plurality of module substrates, wherein the rear surface of the corresponding light guide plate faces the rear side, wherein at least one of the plurality of light guide plates comprises a first region disposed inside a light emission range of the plurality of light sources of a corresponding light source module of the plurality of light source modules, and a second region disposed outside the light emission range of the plurality of light sources of the corresponding light source module, and wherein a density of a second light guiding pattern formed in the second region is greater than a density of a first light guiding pattern formed in the first region, and the first light guiding pattern and the second light guiding pattern are alternately disposed in direction of which the light sources of the corresponding light source module are disposed.

2. The display apparatus according to claim 1, further comprising a diffusion plate which is interposed between the display panel and the plurality of light guide plates and diffuses light transmitted from the light guide plate.

3. The display apparatus according to claim 2, further comprising a cover unit which forms an outer frame of the display apparatus; and a plurality of transparent screws which fasten the plurality of the light guide plates and the plurality of the reflective plates to the cover unit, and wherein each of the transparent screws comprises a screw head which supports the diffusion plate to maintain a gap between the diffusion plate and the plurality of light guide plates.

4. The display apparatus according to claim 1, wherein the second pattern is formed in a third region of the at least one of the plurality of light guide plates, and the third region comprises the second region and has one of a triangular shape and a pentagonal shape.

5. The display apparatus according to claim 1, wherein at least one light guide plate of the plurality light guide plates comprises a first region in which an amount of incident light from the plurality of light sources of a corresponding light source module of the plurality of light source modules is larger than a preset value, and a second region in which an amount of incident light from the plurality of light sources of the corresponding light source module is smaller than the preset value, and wherein the first region has a first light guiding pattern formed thereon and the second region has a second light guiding pattern formed thereon which is different from the first light guiding pattern.

6. The display apparatus according to claim 5, wherein a density of the second light guiding pattern formed in the second region is greater than a density of the first light guiding pattern formed in the first region.

7. The display apparatus according to claim 5, wherein the second region is located between two adjacent light sources of the plurality of light sources of the corresponding light source module.

8. The display apparatus according to claim 1, wherein at least one light guide plate of the plurality of light guide plates comprises a plurality of pattern regions having a preset shape, the pattern regions being formed on a front or rear side of the at least one light guide plate at locations between adjacent light sources of the plurality of light sources of a corresponding light source module.

9. The display apparatus according to claim 1, wherein the plurality of light sources of a first light source module of the plurality of light source modules and the plurality of light sources of a second light source module of the plurality of light source modules adjacent to the first light source module are arranged alternately in a longitudinal direction of the first and second light source modules.

10. A backlight unit for supplying light to a display panel, the backlight unit comprising a plurality of light guide plates;

a plurality of light source modules alternately arranged with the plurality of light guide plates, each light source module being disposed along a lateral side of an adjacent light guide plate of the plurality of light guide plates and comprising a plurality of light sources for emitting light to the lateral side of the adjacent light guide plate, and a module substrate on which the plurality of light sources are mounted and which is disposed at a rear side of the adjacent light guide plate, the rear side of the adjacent light guide plate being perpendicular to the lateral side of the adjacent light guide plate; and a plurality of reflective plates which are respectively disposed on rear surfaces of the plurality of the light guide plates, and reflect the light emitted by the plurality of light sources and transmitted by the plurality of light guide plates, wherein each of the plurality of reflective plates is interposed between a rear surface of a corresponding light guide plate of the plurality of light guide plates and at least one module substrate of the plurality of module substrates, wherein the rear surface of the corresponding light guide plate faces the rear side, wherein at least one of the plurality of light guide plates comprises a first region disposed inside a light emission range of the plurality of light sources of a corresponding light source module of the plurality of light source modules, and a second region disposed outside the light emission range of the plurality of light sources of the corresponding light source module, and wherein a density of a second light guiding pattern formed in the second region is greater than a density of a first light guiding pattern formed in the first region, and the first light guiding pattern and the second light guiding pattern are alternately disposed in direction of which the light sources of the corresponding light source module are disposed.

11. The backlight unit according to claim 10, further comprising a diffusion plate which is disposed on the light guide plate and diffuses light transmitted from the light guide plate.

12. The backlight unit according to claim 11, further comprising a plurality of transparent screws which fasten the plurality of light guide plates and the plurality of reflective plates, wherein each of the transparent screws comprises a screw head which supports the diffusion plate to maintain a gap between the diffusion plate and the light guide plate.

13. The backlight unit according to claim 10, wherein the second pattern is formed in a third region of the at least one of the plurality of light guide plates, and the third region comprises the second region and has one of a triangular shape and a pentagonal shape.

14. The backlight unit according to claim 10, wherein at least one light guide plate of the plurality of light guide plates comprises a first region in which an amount of incident light from the plurality of light sources of a corresponding light source module of the plurality of light source modules is larger than a preset value, and a second region in which an amount of incident light from the plurality of light sources of the corresponding light source module is smaller than the preset value, and wherein the first region has a first light guiding pattern formed thereon and the second region has a second light guiding pattern formed thereon which is different from the first light guiding pattern.

15. The backlight unit according to claim 14, wherein a density of the second light guiding pattern formed in the second region is greater than a density of the first light guiding pattern formed in the first region.

16. The backlight unit according to claim 14, wherein the second region is located between the adjacent two light sources of the plurality of light sources of the corresponding light source module.

17. The backlight unit according to claim 10, wherein the plurality of light sources of a first light source module of the plurality of light source modules and the plurality of light sources of a second light source module of the plurality of light source modules adjacent to the first light source module are arranged alternately in a longitudinal direction of the first and second light source modules.

\* \* \* \* \*